United States Patent
Morimoto (10) Patent No.: US 8,558,915 B2
(45) Date of Patent: Oct. 15, 2013

(54) PHOTOGRAPHING APPARATUS AND METHOD

(75) Inventor: Yasuhiro Morimoto, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 12/976,918

(22) Filed: Dec. 22, 2010

(65) Prior Publication Data
US 2011/0149125 A1 Jun. 23, 2011

(30) Foreign Application Priority Data

Dec. 22, 2009 (JP) ................................. 2009-290773
Feb. 26, 2010 (KR) ........................ 10-2010-0017920

(51) Int. Cl.
*H04N 5/335* (2011.01)
*H04N 5/222* (2006.01)
*H04N 5/235* (2006.01)

(52) U.S. Cl.
USPC ..................... 348/230.1; 348/333.01; 348/294

(58) Field of Classification Search
USPC ........................... 348/294–324, 333.01, 230.1
See application file for complete search history.

(56) References Cited

U.S. PATENT DOCUMENTS

| | | | |
|---|---|---|---|
| 7,697,038 B2 * | 4/2010 | Ohwa .......................... | 348/222.1 |
| 7,932,941 B2 * | 4/2011 | Hayasaka et al. ............. | 348/267 |
| 8,289,440 B2 * | 10/2012 | Knight et al. ................. | 348/349 |
| 2004/0109071 A1 * | 6/2004 | Kido et al. ................... | 348/231.2 |
| 2008/0152215 A1 * | 6/2008 | Horie et al. .................. | 382/154 |
| 2008/0193026 A1 * | 8/2008 | Horie et al. .................. | 382/238 |
| 2009/0128658 A1 * | 5/2009 | Hayasaka et al. ........... | 348/222.1 |
| 2009/0268970 A1 * | 10/2009 | Babacan et al. .............. | 382/232 |
| 2009/0295829 A1 * | 12/2009 | Georgiev et al. ............. | 345/620 |
| 2010/0128145 A1 * | 5/2010 | Pitts et al. ................. | 348/231.99 |
| 2010/0141802 A1 * | 6/2010 | Knight et al. ............... | 348/240.3 |
| 2010/0194921 A1 * | 8/2010 | Yoshioka ................. | 348/231.99 |
| 2012/0294590 A1 * | 11/2012 | Pitts et al. ..................... | 386/282 |
| 2013/0057735 A1 * | 3/2013 | Hirota ........................... | 348/273 |

FOREIGN PATENT DOCUMENTS

| | | | |
|---|---|---|---|
| JP | 2003-163938 A | 6/2003 | |
| JP | 2004-146619 A | 5/2004 | |
| JP | 2005-167484 A | 6/2005 | |
| JP | 2008-085738 A | 4/2008 | |

* cited by examiner

*Primary Examiner* — Sinh Tran
*Assistant Examiner* — Selam Gebriel
(74) *Attorney, Agent, or Firm* — Drinker Biddle & Reath LLP (57) ABSTRACT

A photographing apparatus includes a lens array and a photoelectric conversion unit. The lens array includes a plurality of lenses that are regularly arranged on a single plane. The photoelectric conversion unit includes a plurality of photoelectric conversion areas, each including a plurality of pixels. The plurality of photoelectric conversion areas are installed on a single plane. Each photoelectric conversion area corresponds to an irradiation range of light passing through a respective one of the plurality of lenses of the lens array. The photoelectric conversion unit includes a first mode and at least one second mode. In the first mode, data is continuously read out from all pixels included in the plurality of photoelectric conversion areas. In the at least one second mode, a subset of fewer than all pixels of each of the plurality of photoelectric conversion areas are selected and used to generate a color image. The selected pixels of each of the plurality of photoelectric conversion areas are at relatively the same positions with respect to each respective lens of the lens array. Data is continuously read out from the selected pixels.

8 Claims, 7 Drawing Sheets

PHOTOGRAPHING APPARATUS AND METHOD

CROSS-REFERENCE TO RELATED PATENT APPLICATIONS

This application claims the priority benefits of Japanese Patent Application No. 2009-290773, filed on Dec. 22, 2009, in the Japanese Patent Office, and Korean Patent Application No. 10-2010-0017920, filed on Feb. 26, 2010, in the Korean Intellectual Property Office, the disclosures of which are incorporated herein in their entirety by reference.

BACKGROUND

1. Field of the Invention

Embodiments relate to a photographing apparatus and method.

2. Description of the Related Art

A conventional general digital still camera generates a color image signal by irradiating light focused by a focus lens onto a photographing element such as a charge-coupled device (CCD) image sensor or a complementary metal-oxide-semiconductor (CMOS) image sensor. Recently, a photographing apparatus including an optical system having a lens array formed of a microlens group arranged on a single plane between a lens and a photographing element has been suggested. The photographing apparatus is referred to as a plenoptic photographing apparatus.

Technologies to freely determine the depth of field by reconfiguring an image obtained by an optical system, to facilitate application to a 3D image, to focus with parallax, and to increase resolution, by using the plenoptic photographing apparatus, are well known.

SUMMARY

In the above-described photographing apparatus including an optical system having a lens array formed of a microlens group, all outputs of the photographing apparatus are temporarily stored in a memory and necessary image data is selectively processed to reconfigure an image. However, in actual consideration of the environment in which the photographing apparatus including an optical system having a lens array formed of a microlens group is used, a live view image for checking in real time an image formed by the optical system needs to be generated. Thus, when all outputs of the photographing apparatus are temporarily stored in a memory, the processing of a live view image takes some time and a live view image of a certain frame may not be output.

To solve the above and/or other problems, embodiments of a photographing apparatus and method may read data from a photographing element to efficiently generate a live view image without deteriorating the advantages of the optical system having a lens array formed of a microlens group.

According to an embodiment, a photographing apparatus includes a lens array in which a plurality of lenses are regularly arranged on a single plane, and a photoelectric conversion unit that comprises a plurality of photoelectric conversion areas each including a plurality of pixels. The plurality of photoelectric conversion areas are installed on a single plane, each photoelectric conversion area corresponding to an irradiation range of light passing through a respective one of the plurality of lenses of the lens array. The photoelectric conversion unit comprises a first mode in which data is continuously read out from all pixels included in the plurality of photoelectric conversion areas, and at least one second mode in which a subset of fewer than all pixels of each of the plurality of photoelectric conversion areas are selected and used to generate a color image, wherein the selected pixels of each of the plurality of photoelectric conversion areas are at relatively the same positions with respect to each respective lens of the lens array, and wherein data is continuously read out from the selected pixels.

According to the above structure, in a lens array, a plurality of lenses are regularly arranged on a single plane, and a photoelectric conversion unit includes a plurality of photoelectric conversion areas, each including a plurality of pixels, the plurality of photoelectric conversion areas are installed on a single plane, each photoelectric conversion area corresponding to an irradiation range of light passing through a respective one of the plurality of lenses of the lens array. The photoelectric conversion unit may read out data from a pixel in a plurality of modes. In at least one second mode, a subset of fewer than all pixels of each of the plurality of photoelectric conversion areas are selected and used to generate a color image, wherein the selected pixels of each of the plurality of photoelectric conversion areas are at relatively the same positions with respect to each respective lens of the lens array, and wherein data is continuously read out from the selected pixels. As a result, a live view image may be efficiently generated without deteriorating the advantages of the optical system having a lens array formed of a microlens group.

The selected pixels may be arranged in the second mode in a Bayer pattern. As a result, a color image may be generated from the pixel selected in the second mode.

When the number of pixels on one side of the pluralities of pixels respectively forming each photoelectric conversion area is odd, the photoelectric conversion unit may read out data in the second mode from an area having one side formed of an odd number of pixels that is smaller than the number of pixels on one side of the pluralities of pixels respectively forming each photoelectric conversion area. As a result, a pixel may be selected in each of the photoelectric conversion areas to enable generation of a color image.

When the number of pixels on one side of the pluralities of pixels respectively forming each photoelectric conversion area is even, the photoelectric conversion unit may read out data in the second mode from an area having one side formed of an even number of pixels that is smaller than the number of pixels on one side of the pluralities of pixels respectively forming each photoelectric conversion area. As a result, a pixel may be selected in each of the photoelectric conversion areas to enable generation of a color image.

The photographing apparatus may further include a display unit that converts an image generated using the data read out from the photoelectric conversion unit in the second mode according to a predetermined cycle and displays the converted image. As a result, an image generated using the data read out from the photoelectric conversion unit in the second mode may be displayed.

An image to be displayed on the display unit may be generated by directly reading out data from each pixel of the photoelectric conversion unit, or by using a representative value of each of red, green, and blue pixels of the photoelectric conversion unit. As a result, the amount of calculation during generation of a color image using the read-out data may be reduced by using the representative value.

The representative values may be calculated in advance in the photoelectric conversion unit. Also, the photographing apparatus may further include a calculation unit that calculates the representative value after data is read out from the photoelectric conversion unit. As a result, the amount of calculation during generation of a color image using the read-out data may be reduced.

When data is read out from the photoelectric conversion unit in the second mode, the photoelectric conversion area corresponding to all lenses of the lens array may be targeted. Also, when data is read out from the photoelectric conversion unit in the second mode, the photoelectric conversion area corresponding to less than all of the lenses of the lens array may be targeted. As a result, the amount of calculation during generation of a color image using the read-out data may be reduced.

An optical axis of the lens array may be moved in a direction in which light is irradiated that is perpendicular to the photoelectric conversion unit at a periphery portion of the photoelectric conversion unit. As a result, the image quality of the periphery portion may be improved by obtaining the amount of light by shifting the optical axis of the lens array in a direction in which light is irradiated perpendicularly to the photoelectric conversion unit.

Another embodiment includes a photographing method of a photographing apparatus that includes a lens array in which a plurality of lenses are regularly arranged on a single plane and a photoelectric conversion unit that comprises a plurality of photoelectric conversion areas each including a plurality of pixels, the plurality of photoelectric conversion areas installed on a single plane, each of the plurality of photoelectric conversion areas corresponding to an irradiation range of light passing through one of the plurality of lenses of the lens array. The photographing method includes selecting a data read-out mode from among a first mode and at least one second mode, and reading out data according to the selected data read-out mode. In the first mode, data is continuously read out from all pixels included in the plurality of photoelectric conversion areas. In the at least one second mode, a subset of fewer than all pixels of each of the plurality of photoelectric conversion areas are selected and used to generate a color image, wherein the selected pixels of each of the plurality of photoelectric conversion areas are at relatively the same positions with respect to each respective lens of the lens array, and wherein data is continuously read out from the selected pixels.

BRIEF DESCRIPTION OF THE DRAWINGS

The above and other features and advantages will become more apparent by describing in detail exemplary embodiments with reference to the attached drawings in which.

DETAILED DESCRIPTION

The attached drawings for illustrating exemplary embodiments are referred to in order to gain a sufficient understanding of the embodiments, the merits thereof, and the objectives accomplished by the implementation of the embodiments.

Hereinafter, exemplary embodiments will be described in detail with reference to the attached drawings. Like reference numerals in the drawings denote like elements.

Prior to the description of an embodiment in detail, the structure of an optical system having a lens array formed of a microlens group will be described and then the structure of a photographing apparatus having the lens array will be described.

Figure 1:
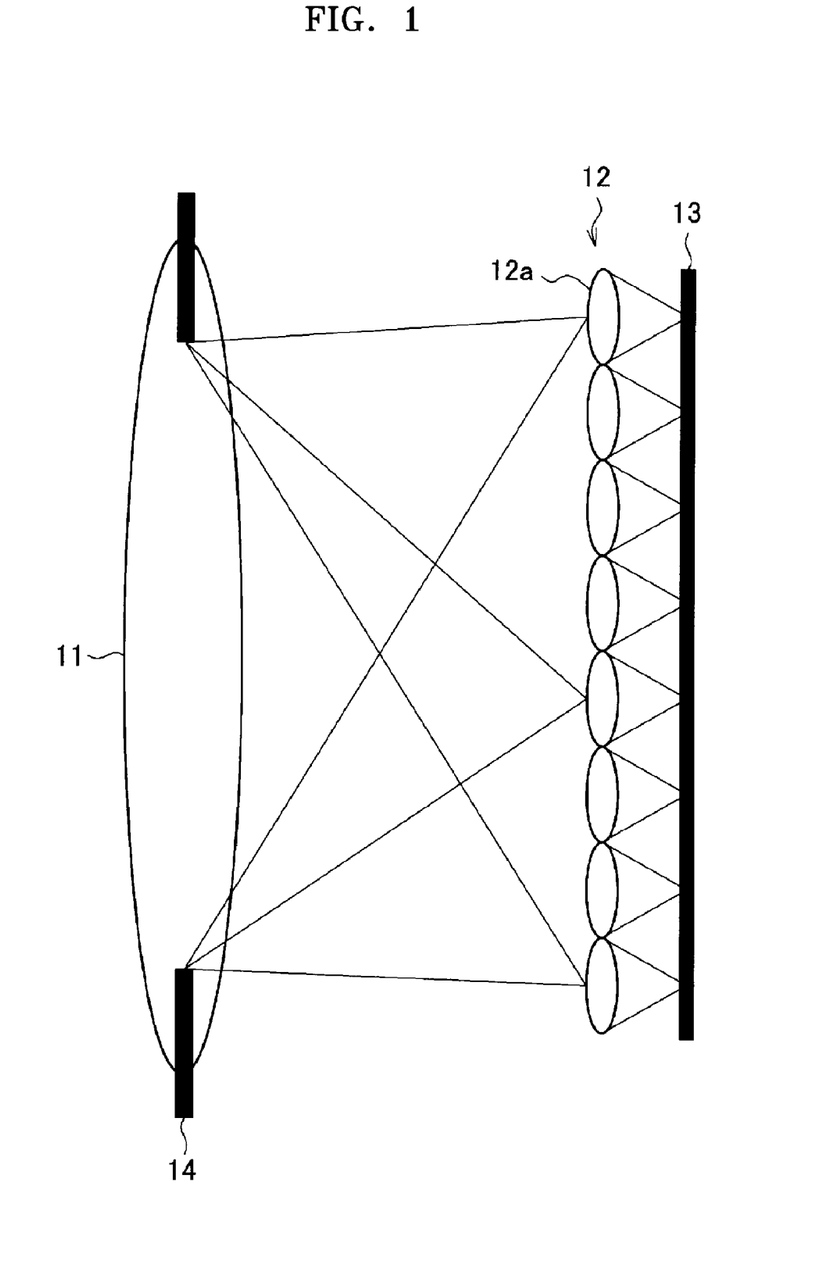
FIGS. 1 and 2 are views for explaining an optical system having a lens array formed of a microlens group.
Figure 2:
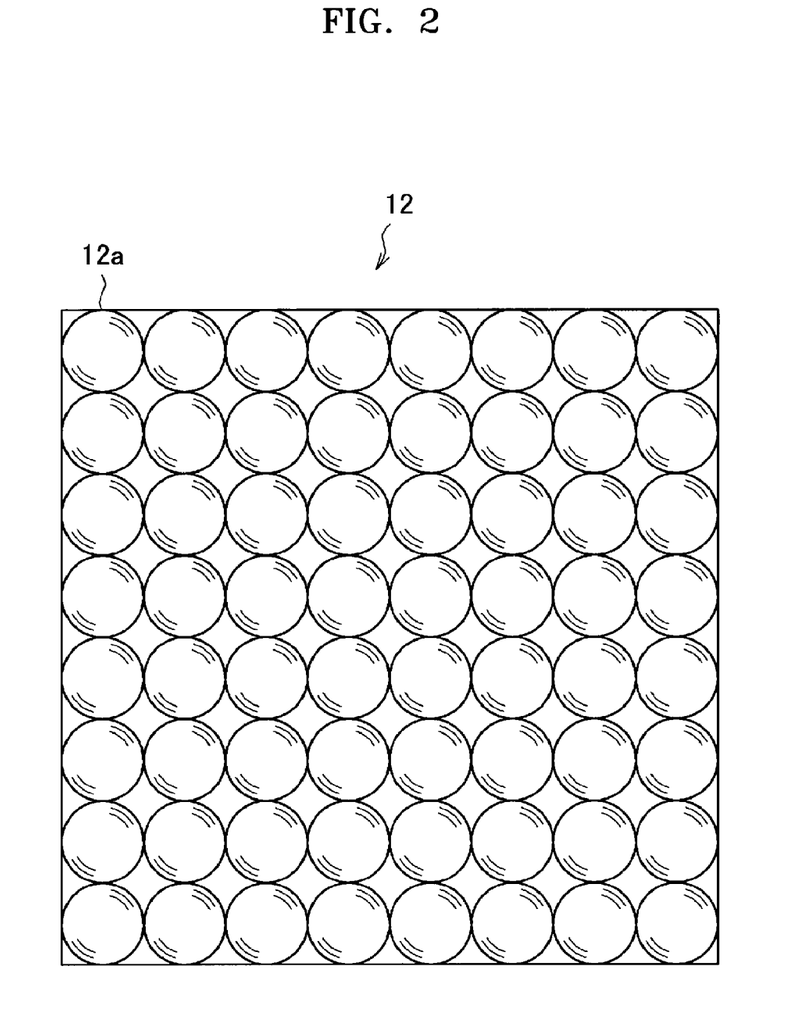

FIGS. 1 and 2 are views for explaining an optical system having a lens array formed of a microlens group. FIG. 1 is a side view showing a state in which a lens array is arranged between a lens for focusing light from an object and a photographing element. FIG. 2 is a conceptual diagram showing the arrangement of a lens array.

Referring to FIG. 1, in an optical system having a lens array formed of a microlens group, light from an object may pass through a main lens 11 and may be projected to a microlens 12a of a lens array 12 to be in focus. The light passing through the microlens 12a may be emitted onto an image sensor 13.

An iris 14 of the main lens 11 is set to prevent light output from neighboring microlenses from overlapping each other. The depth of field may be freely determined by reconfiguring an image obtained by the optical system of FIG. 1. Thus, the optical system having a lens array formed of a microlens group is used to facilitate application to a 3D image, to focus with parallax, and to increase resolution.

However, as described above, in consideration of the environment in which a photographing apparatus including an optical system having a lens array formed of a microlens group is used, a live view image for checking in real time an image formed in the optical system needs to be generated. Thus, when all outputs of the photographing apparatus are temporarily stored in a memory, it takes some time to process the live view image and thus the photographing apparatus appears nonresponsive in that the live view image does not update frequently enough to include all frames. However, a photographing apparatus according to an embodiment as described herein may efficiently generate a live view image without deteriorating the advantages of an optical system including a lens array formed of a microlens group.

Figure 3:
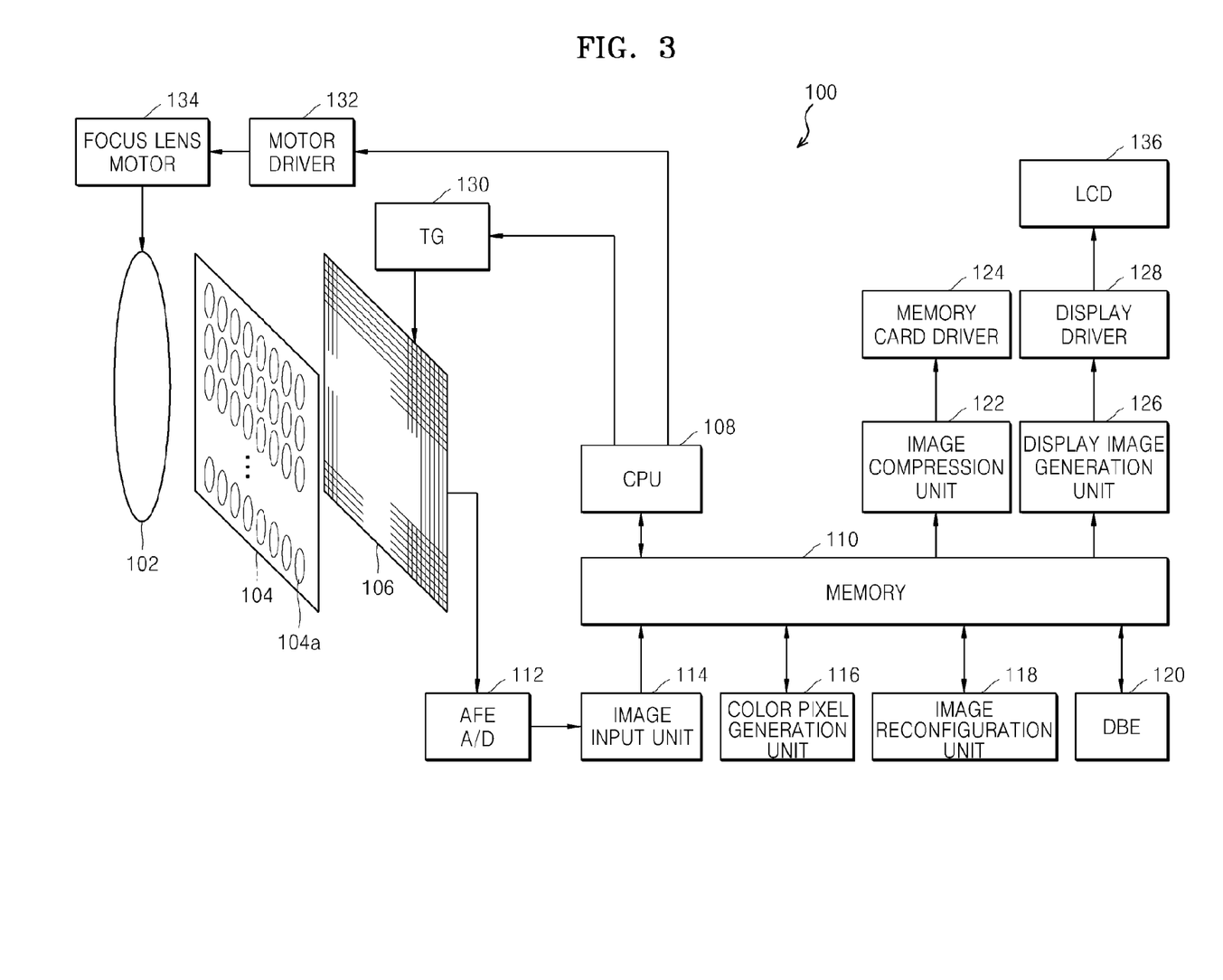
FIG. 3 is a block diagram of a photographing apparatus, according to an embodiment.

Next, the structure of a photographing apparatus 100 including an optical system according to an embodiment will be described with reference to FIG. 3. FIG. 3 is a block diagram of the photographing apparatus 100, according to an embodiment.

Referring to FIG. 3, the photographing apparatus 100 of the present embodiment includes a main lens 102, a microlens array 104, an image sensor 106, a CPU 108, a memory 110, an analog front end (AFE) and analog-to-digital (A/D) conversion unit 112, an image input unit 114, a color pixel generation unit 116, an image reconfiguration unit 118, a digital backend (DBE) unit 120, an image compression unit 122, a memory card driver 124, a display image generation unit 126, a display driver 128, a timing generator (TG) 130, a motor driver 132, a focus lens motor 134, and a liquid crystal display (LCD) 136.

The main lens 102 includes a focus lens to focus on a subject and/or a zoom lens to vary a focal length. By using the focus lens motor 134 to move the position of the focus lens of the main lens 102, the photographing apparatus 100 may focus the image of the object.

The microlens array 104 is a lens array formed of a plurality of microlenses. The microlens array 104 is configured by regularly arranging a plurality of microlenses 104a on a single plane. Light passing through the main lens 102 passes through each of the microlenses 104a of the microlens array 104 and is emitted onto the image sensor 106. The image sensor 106 generates an image signal from the light passing through the microlenses 104a forming the microlens array 104.

The CPU 108 controls the operation of each unit of the photographing apparatus 100. The CPU 108 executes computer programs stored in the photographing apparatus 100, thereby controlling the operation of each unit of the photographing apparatus. Also, the memory 110 stores information or data needed for the operation of the photographing apparatus 100.

The AFE and A/D unit 112 receives an analog signal that is photoelectrically converted by the image sensor 106, converts the received analog signal to a digital signal, and outputs the digital signal. The digital signal generated by the AFE and A/D unit 112 is transmitted to the image input unit 114.

The image input unit 114 receives the digital signal generated by the AFE and A/D unit 112 and stores the received digital signal in the memory 110. As the digital signal generated by the AFE and ND unit 112 is stored in the memory 110, the photographing apparatus 100 may perform various signal processes on the digital signal.

The color pixel generation unit 116 performs a signal process of generating color data using the image signal generated from the light received by the image sensor 106.

The image reconfiguration unit 118 reconfigures an image passed through the microlens array 104 and captured by the image sensor 106. The image reconfiguration unit 118 may change an image of an in-focus image of an object by varying the depth of field by, for example, reconfiguring the image passed through the microlens array 104 and captured by the image sensor 106. Also, the image reconfiguration unit 118 may perform a resolution enhancement process by removing noise or correcting color.

The color pixel generation unit 116 colorizes the image passed through the microlens array 104 and captured by the image sensor 106. The DBE unit 120 processes the image passed through the microlens array 104 and captured by the image sensor 106 and colorized by the color pixel generation unit 116. The DBE unit 120 performs, for example, a process of emphasizing chroma or a process of converting an image size.

The image compression unit 122 compresses the image data into an appropriate format. The image compression format may be either a reversible format or an irreversible format. The appropriate format may include, for example, a Joint Photographic Experts Group (JPEG) format or a JPEG2000 format. The memory card driver 124 may record the image data compressed by the image compression unit 122 on a memory card (not shown) and then later may read out the image data from the memory card.

The display image generation unit 126 generates an image (a display image) to be displayed on the LCD 136 for displaying a captured image or various setting screens of the photographing apparatus 100. For example, when a display image is to be displayed on the LCD 136, the display image generation unit 126 converts image data according to the resolution or screen size of the LCD 136 and generates the display image. The display driver 128 displays the display image generated by the display image generation unit 126 on the LCD 136.

The TG 130 inputs a timing signal to the image sensor 106. A shutter speed is determined by the timing signal output from the TG 130. That is, in response to the timing signal of the TG 130, the driving of the image sensor 106 is controlled and the image sensor 106 is exposed to light from an object in synchronism with a shutter (not shown). Then, a reading operation is performed and thus an electric signal based on image data is generated.

The motor driver 132 drives the focus lens motor 134, and is controlled by the CPU 108. The focus lens motor 134 controls the position of the main lens 102 using a motor (not shown). The focus of an image of an object may be controlled by controlling the position of the main lens 102 by using the motor driver 132 and the focus lens motor 134.

The LCD 136 is formed of, for example, an LCD panel, and may display a live view image, a photographed image, or an image recorded in the memory card.

Although not illustrated in FIG. 3, the photographing apparatus 100 may further include an iris, a motor for adjusting the iris, and a motor driver for driving the motor. Also, although not illustrated in FIG. 3, the photographing apparatus 100 may further include a shutter button for starting a photographing operation and operation buttons for setting photography information such as an iris or shutter speed and sensitivity.

In the photographing apparatus 100 having the described-above structure configured as described above according to the present embodiment, a finder function is to be provided to display a live view image on the LCD 136. A finder function using pixel data photoelectrically converted by the image sensor 106 through the microlens array 104 is provided to reduce the size and costs of the photographing apparatus 100.

In order to generate a live view image using the image sensor 106, a read-out mode for generating a live view image may be provided in the image sensor 106. In order to improve the live view image, a process time or a process load is to be reduced. In detail, a read-out mode in which pixel data is read out from selected pixels, and not read out from all pixels, is provided in the image sensor 106. Also, to generate a live view color image using the image sensor 106, even when pixel data is to be read out in a read-out mode for generating a live view image, a filter capable of generating a color image is provided in the photographing sensor 106.

The photographing apparatus 100, which includes the image sensor 106, which may include a read-out mode for reading out pixel data from selected pixels for efficient generation of a live view image and which may simultaneously generate a color image using the selected read-out pixel data, will be described below. In the following description, the read-out mode for reading out pixel data from selected pixels is referred to as a second mode, whereas a read-out mode for reading out pixel data from all pixels is referred to as a first mode. Also, in the following description, a switching process to determine a read-out mode in the photographing apparatus 100 according to an embodiment will be presented. Then, a read-out process in the second mode will be described.

Figure 4:
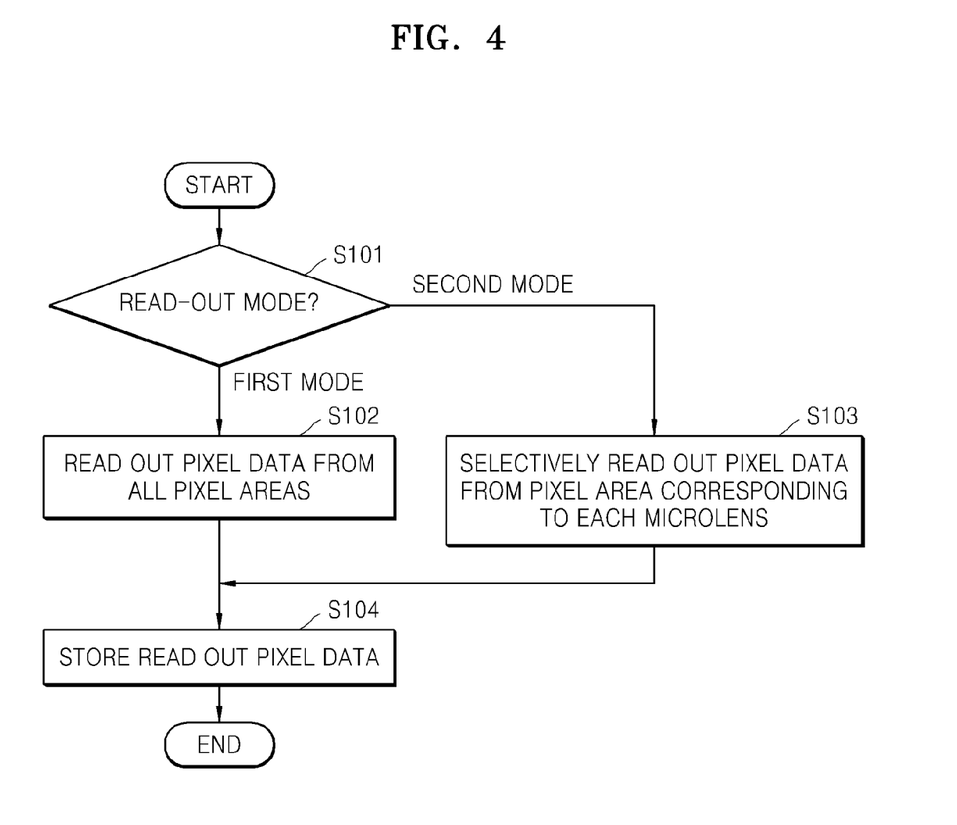
FIG. 4 is a flowchart for explaining a switching process to determine a read mode of the photographing apparatus of FIG. 3, according to an embodiment.

FIG. 4 is a flowchart for explaining the switching process to determine a read mode of the photographing apparatus 100 of FIG. 3, according to an embodiment. The switching process to determine a read-out mode of the image sensor 106 in the photographing apparatus 100 according to an embodiment will be described with reference to FIG. 4.

First, the CPU 108 determines in which mode pixel data is to be read out from the image sensor 106 (Operation S101). That is, the CPU 108 determines in which of the first and second modes pixel data is to be read out from the image sensor 106.

The determination of which of the first and second modes pixel data is to be read out from the image sensor 106 may be performed based on the operational state of the photographing apparatus 100. For example, when the photographing apparatus 100 displays a live view image on the LCD 136, the CPU 108 may determine that pixel data is to be read out in the second mode from the image sensor 106. Also, when a user presses the shutter button of the photographing apparatus 100 so as to start a photographing operation, the CPU 108 may determine that pixel data is to be read out in the first mode from the image sensor 106.

As a result of the determination in the operation S101, when the CPU 108 determines that pixel data is to be read out in the first mode from the image sensor 106, the CPU 108 requires the TG 130 to generate a timing signal for reading out pixel data from all pixels of the image sensor 106. Then, pixel data is read out from all pixels of the image sensor 106 according to the timing signal generated by the TG 130 (Operation S102).

When the CPU 108 determines that pixel data is to be read out in the second mode from the image sensor 106, the CPU 108 requires the TG 130 to generate a timing signal for reading out pixel data from some pixels of the image sensor 106. Then, pixel data is read out from the some pixels of the image sensor 106 according to the timing signal generated by the TG 130 (Operation S103).

When pixel data is read out from all or some pixels of the image sensor 106 in the operation of S102 or S103, the pixel data read out from the image sensor 106 is stored in the memory 110 (Operation S104). As the pixel data read out from the image sensor 106 is stored in the memory 110, image data or a live view image may be generated by using the stored pixel data.

In the description above, the switching process to determine a read-out mode in the photographing apparatus 100 according to an embodiment is described. Next, the read-out process in the second mode according to an embodiment will now be described.

Figure 5:
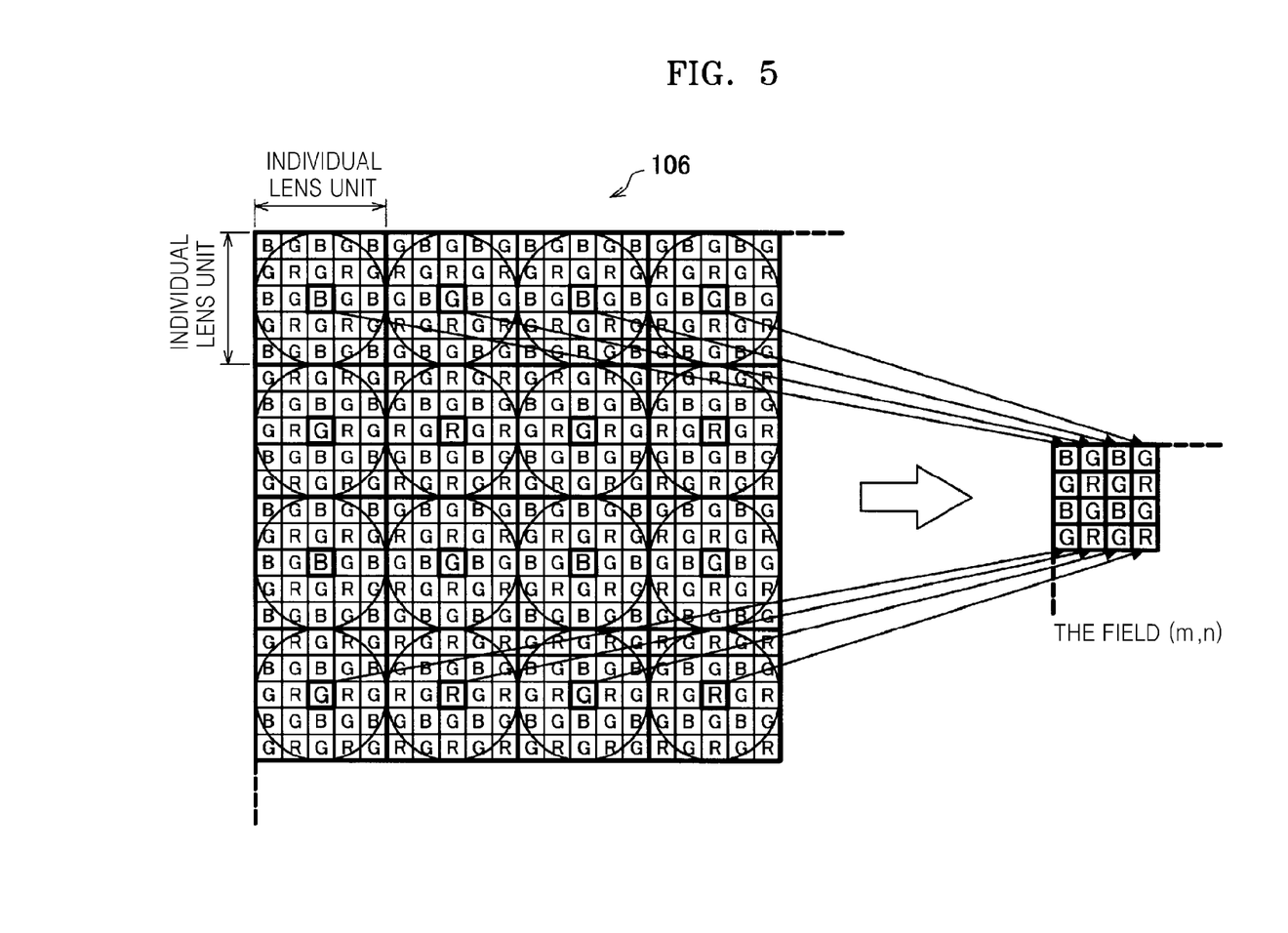
FIGS. 5 and 6 are views for explaining a pixel data read-out process of a image sensor in a second mode, according to an embodiment.

First, a case in which the number of pixels on one side of each group of pixels respectively corresponding to each of the microlenses 104a is odd will be described below. FIG. 5 is a view for explaining the pixel data read-out process of the image sensor 106 in the second mode when the number of pixels on one side of each group of pixels respectively corresponding to each of the microlenses 104a is five, according to an embodiment. The principle of the pixel data read-out process of the image sensor 106 in the second mode will be described below with reference to FIG. 5.

Each circle in FIG. 5 indicates an area onto which light is projected by one of the microlenses 104a. Also, as illustrated in FIG. 5, the image sensor 106 has a Bayer pattern that is formed of R, G, and B pixels.

In the present embodiment, when pixel data is to be read out from the image sensor 106 in the second mode, one of 25 pixels assigned to one of the microlenses 104a is selected and pixel data of the selected pixel is read out. Also, the positions of the pixels from which the pixel data is to be read out from the image sensor 106 are substantially the same in all pixel areas corresponding to the microlenses 104a. As such, as pixels from which pixel data is to be read out are selected and the pixel data is read out from the corresponding pixels, the pixels from which the pixel data is read out may have the same Bayer pattern as the image sensor 106. Also, since the selected pixels have a Bayer pattern, a full color image may be generated by using the pixel data of the selected pixels.

In the embodiment of FIG. 5, a pixel at the center of an area formed of 25 pixels arranged in a 5×5 square that is assigned to one of the microlenses 104a is selected as a pixel from which pixel data is to be read out. By selecting the pixels at the centers of the areas, each including 25 pixels, the center pixels may have the same Bayer pattern as the image sensor 106. Thus, by selecting one of the 25 pixels assigned to one of the microlenses 104a, and by selecting pixels having relatively the same positions in the areas corresponding to the microlenses 104a, a full color image may be generated by using pixel data of the selected pixels.

In addition, in the embodiment of FIG. 5, the pixel at the center of the group of 25 pixels assigned to one of the microlenses 104a is selected as a pixel from which pixel data is to be read out. However, this is not to be construed as limiting. A pixel at a position different from the position marked in FIG. 5 in the second mode may be selected as long as the pixel is a pixel of a corresponding area, and the selected pixels are to have relatively the same position in the areas corresponding to the microlenses 104a. Also, although in the above-described embodiment the pixels of the image sensor 106 have a Bayer pattern, this is not to be construed as limiting. Accordingly, a pixel array generated by the selection is not limited to the Bayer pattern.

For example, when a set of pixels at the centers of areas each including a total of 25 pixels arranged in a 5×5 square and each assigned to one of the microlenses 104a is defined as a field (0,0), a set of pixels shifted m pixels to the right and n pixels down with respect to the center pixel is defined as a field (m,n). In the embodiment of FIG. 5, m may be an integer value in a range between −2 to 2 and n may also be an integer value in a range between −2 to 2. Also, to generate a full color image in the second mode, the values of m and n are determined to be included in the area where light is projected by the microlenses 104a.

Also, although in the embodiment of FIG. 5 the number of pixels selected from each area formed of 25 pixels and assigned to one of the microlenses 104a is one, this is not to be construed as limiting. For example, when pixel data is read out from the image sensor 106 in the second mode, the pixel data may be read out from 9 pixels arranged in a 3×3 square selected from each area formed of 25 pixels.

Figure 6:
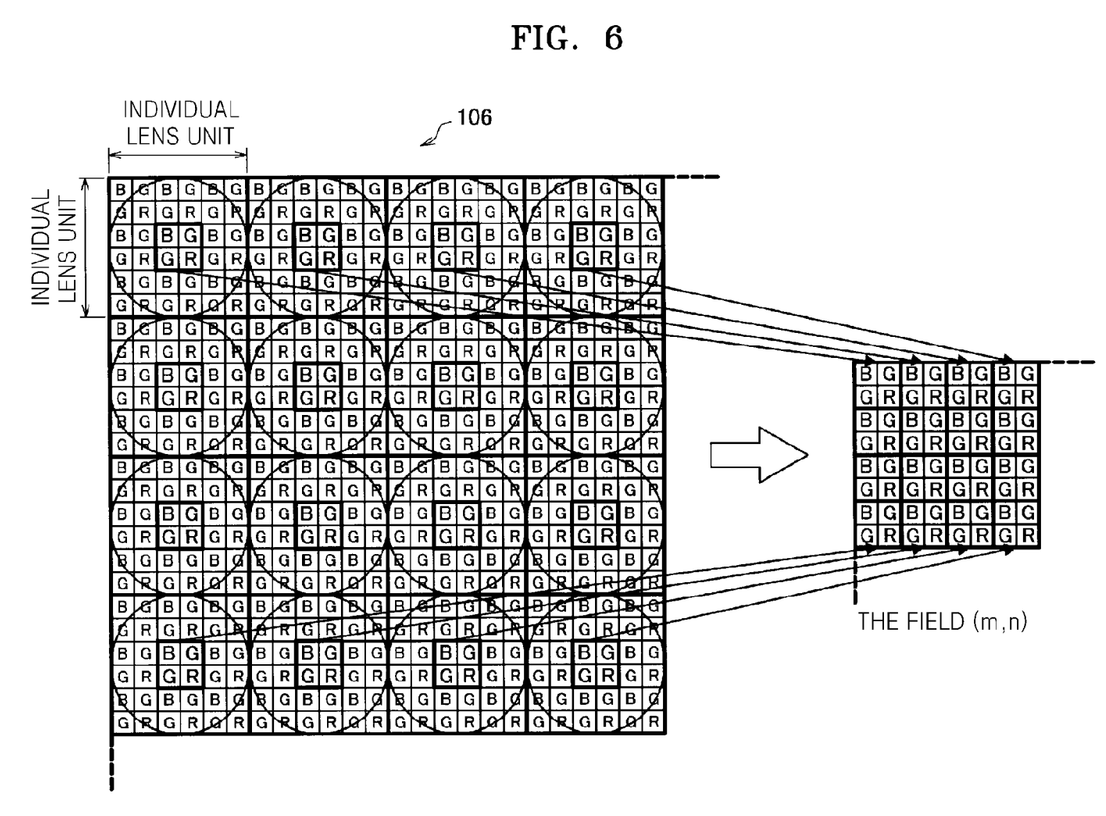

A case in which the number of pixels on one side of each group of pixels respectively corresponding to each of the microlenses 104a is even will be described below. FIG. 6 is a view for explaining the pixel data read-out process of the image sensor 106 in the second mode when the number of pixels on one side of each group of pixels respectively corresponding to each of the microlenses 104a is six, according to an embodiment. The principle of the pixel data read-out process of the image sensor 106 in the second mode will be described below with reference to FIG. 6.

Each circle in FIG. 6 indicates an area onto which light is projected by one of the microlenses 104a. Also, as illustrated in FIG. 6, the image sensor 106 has a Bayer pattern that is formed of R, G, and B pixels.

In the present embodiment, when pixel data is to be read out from the image sensor 106 in the second mode, a total of 4 pixels arranged in a 2×2 square of 36 pixels assigned to one of the microlenses 104a is selected and pixel data of the selected 4 pixels is read out. Also, the positions of the pixels from which the pixel data is to be read out from the image sensor 106 are to relatively match with one another in all pixel areas corresponding to the microlenses 104a. As such, as pixels from which pixel data is to be read out are selected and the pixel data is read out from the corresponding pixels, the pixels from which the pixel data is read out may have the same Bayer pattern as the image sensor 106. Also, since the selected pixels have a Bayer pattern, a full color image may be generated by using the pixel data of the selected pixels.

In the embodiment of FIG. 6, 4 pixels at the center portion of an area formed of 36 pixels arranged in a 6×6 square that is assigned to one of the microlenses 104a is selected as pixels from which pixel data is to be read out. By selecting the 4 pixels arranged in a 2×2 square at the center portions of the areas, each including 36 pixels, the pixels may have the same Bayer pattern as the image sensor 106. Thus, by selecting 4 pixels of the 36 pixels assigned to one of the microlenses 104a, and by selecting pixels having the relatively same positions in the areas corresponding to the microlenses 104a, a full color image may be generated by using pixel data of the selected pixels.

In addition, in the embodiment of FIG. 6, the 4 pixels at the center portion of the group of 36 pixels assigned to one of the microlenses 104a are selected as pixels from which pixel data is to be read out. However, this is not to be construed as limiting. Pixels at a position different from the position marked in FIG. 6 in the second mode may be selected as long as the pixels are pixels of a corresponding area, and the selected pixels are to have relatively the same position in the areas corresponding to the microlenses 104a.

For example, when a set of 4 pixels arranged in a 2×2 square at the center portions of areas each including a total of 36 pixels arranged in a 6×6 square and each assigned to one of the microlenses 104a, is defined as a field (0,0), a set of pixels shifted m pixels to the right and n pixels down with respect to the center portion is defined as a field (m,n). In the embodiment of FIG. 6, m may be an integer value in a range between −2 to 2 and n may also be an integer value in a range between −2 to 2. Also, to generate a full color image in the second mode, the values of m and n are determined to be included in the area where light is projected by the microlenses 104a.

Also, although in the embodiment of FIG. 6 the number of pixels selected from each area formed of 36 pixels and assigned to one of the microlenses 104a is four, this is not to be construed as limiting. For example, when pixel data is read out from the image sensor 106 in the second mode, the pixel data may be read out from 16 pixels arranged in a 4×4 square selected from each area formed of 36 pixels.

In the above description, the case in which the number of pixels on one side of each group of pixels corresponding to each of the microlenses 104a is even is described. The order of reading out pixels from a CMOS sensor, for example, a 4-channel reading CMOS sensor, used as the image sensor 106, will be described below.

Figure 7:
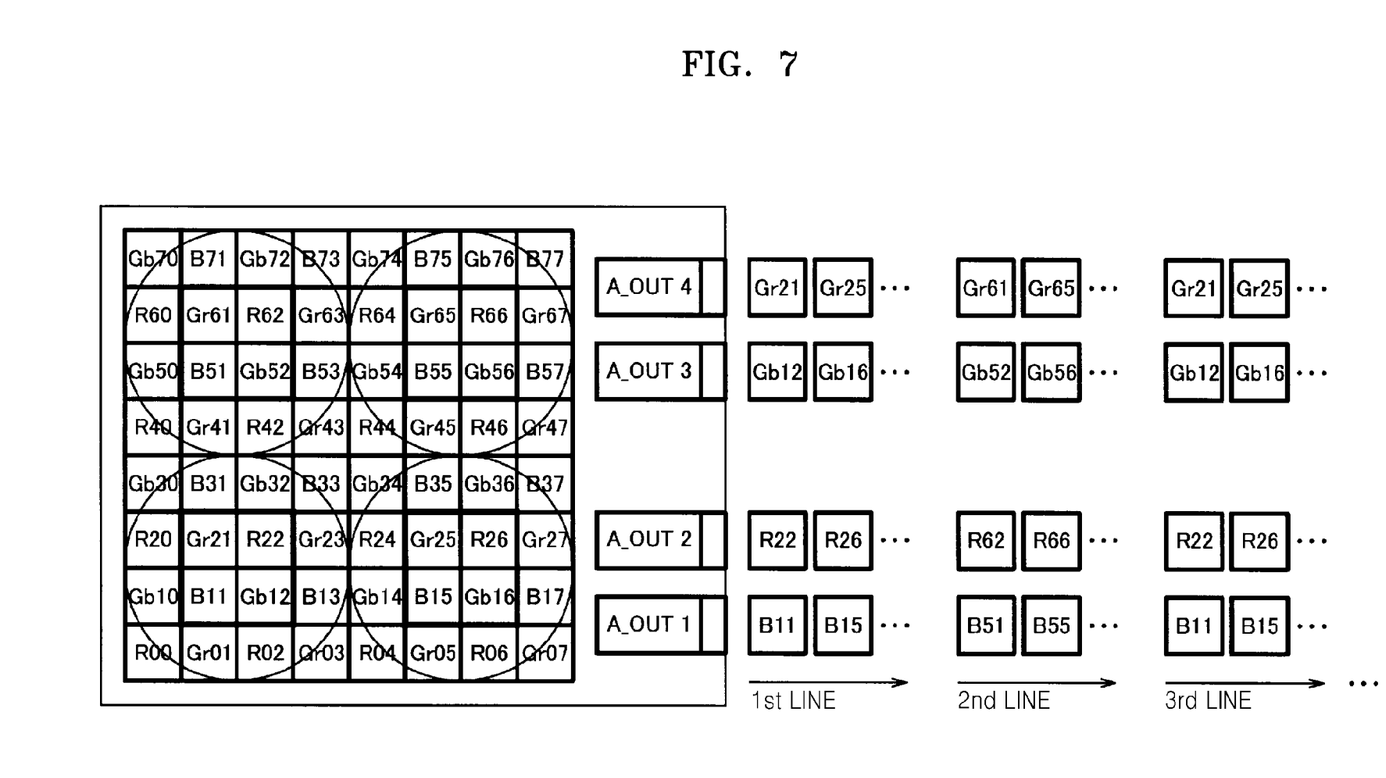
FIG. 7 is a view for explaining the order of reading out pixels from a CMOS sensor, according to an embodiment.

FIG. 7 is a view for explaining the order of reading out pixels from a CMOS sensor when a CMOS sensor with 4-channel output is used as the image sensor 106 and microlenses are arranged as illustrated in FIG. 6, according to an embodiment. Four neighboring pixels Gr, Gb, R, and B are simultaneously output from four output channels. In the structure of FIG. 7, four pixels of B11, R22, Gb12, and Gr21 are simultaneously output at a first clock, and four pixels of B15, R26, Gb16, and Gr25 are simultaneously output at a next clock. After the first line is output, the second line and then the third line are sequentially output.

Although the 4-channel CMOS sensor is described herein, a CMOS sensor with one channel output or 2-channel output may be employed. For example, when a CMOS sensor with 2-channel output is in use, B11 and Gr21 are output at a first clock, Gb12 and R22 are output at a next clock, and so forth.

As described above, according to various embodiments, in the photographing apparatus 100 including an optical system having a lens array formed of a microlens group, the image sensor 106 has the first mode in which pixel data is to be read out from all pixels and the second mode in which pixel data is to be read out from some pixels. When pixel data is to be read out from the image sensor 106 in the second mode, the positions of pixels from which pixel data is to be read out are to relatively match with one another in each area respectively corresponding to each of the microlenses 104a. By selecting the pixels from which pixel data is to be read out as above, even in the second mode, the arrangement of a color filter may be maintained in the original arrangement state in the image sensor 106.

As described above, in the photographing apparatus and method according to various embodiments, a live view image may be efficiently generated without deteriorating the advantages of the optical system including a lens array of a microlens group.

While this invention has been particularly shown and described with reference to exemplary embodiments thereof, it will be understood by those skilled in the art that various changes in form and details may be made therein without departing from the spirit and scope of the invention as defined by the appended claims.

For example, although in the above-described embodiment the positions of pixels from which pixel data is to be read out may relatively match with one another in each area respectively corresponding to each of the microlenses 104a, this is not to be construed as limiting. For example, a representative value of each of R, G, and B pixels in each area corresponding to each of the microlenses 104a may be obtained and thus a live view image may be generated using the representative value of each of R, G, and B pixels. The representative value may be a weighted average of each of R, G, and B pixel values in each area corresponding to each of the microlenses 104a. The weighted average of each of R, G, and B pixel values may be calculated in the image sensor 106 in advance and read out from the image sensor 106. Also, the pixel data may be read out from the image sensor 106 and then the representative value of each of R, G, and B pixels may be calculated.

For example, in the above-described embodiment, all microlenses are used as a target, but this is not to be construed as limiting. For example, a microlens subject to a target is filtered and selected and then a pixel is selected from within the irradiation range of a selected microlens so that pixel data may be read out from a corresponding pixel. Even in a case of selecting a microlens through filtering, a representative value of each of R, G, and B pixels in each area corresponding to each of the microlenses 104a may be obtained. A live view image may be generated using the representative value of each of R, G, and B pixels. The representative value may be, for example, a weighted average value of each of R, G, and B pixels in each area corresponding to each of the microlenses 104a. The representative value of each of R, G, and B pixels may be calculated in the image sensor 106 in advance and read out from the image sensor 106. Also, the pixel data may be read out from the image sensor 106 and then the representative value of each of R, G, and B pixels may be calculated.

Also, although in the above-described embodiment, a pixel at the approximate center of each microlens is selected, light is obliquely input at a periphery portion in an actual image sensor. Thus, to perform correction according to the input of light, a microlens may be shifted in a direction in which light is irradiated, that is, perpendicularly to the image sensor, at the periphery portion of the image sensor. By obtaining the amount of light by shifting the microlens, the image quality at the periphery portion of the image sensor may be improved.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A photographing apparatus comprising:
a lens array in which a plurality of lenses are regularly arranged on a single plane; and
a photoelectric conversion unit comprising a plurality of photoelectric conversion areas each including a plurality of pixels, the plurality of photoelectric conversion areas installed on a single plane, each photoelectric conversion area corresponding to an irradiation range of light passing through a respective one of the plurality of lenses of the lens array,
wherein the photoelectric conversion unit comprises:
a first mode in which data is continuously read out from all pixels included in the plurality of photoelectric conversion areas; and
at least one second mode in which a subset of fewer than all pixels of each of the plurality of photoelectric conversion areas are selected and used to generate a color image,
wherein the selected pixels of each of the plurality of photoelectric conversion areas are at relatively the same positions with respect to each respective lens of the lens array, and
wherein data is continuously read out from the selected pixels.

2. The photographing apparatus of claim 1, wherein the selected pixels are arranged in the second mode in a Bayer pattern.

3. The photographing apparatus of claim 1, wherein, when the number of pixels on one side of the pluralities of pixels respectively forming each photoelectric conversion area is odd, the photoelectric conversion unit reads out data in the second mode from an area having one side formed of an odd number of pixels that is smaller than the number of pixels on one side of the pluralities of pixels respectively forming each photoelectric conversion area.

4. The photographing apparatus of claim 1, wherein, when the number of pixels on one side of the pluralities of pixels respectively forming each photoelectric conversion area is even, the photoelectric conversion unit reads out data in the second mode from an area having one side formed of an even number of pixels that is smaller than the number of pixels on one side of the pluralities of pixels respectively forming each photoelectric conversion area.

5. The photographing apparatus of claim 1, further comprising a display unit that converts an image generated using the data read out from the photoelectric conversion unit in the second mode according to a predetermined cycle and displays the converted image.

6. The photographing apparatus of claim 5, wherein an image to be displayed on the display unit is generated by directly reading out data from each pixel of the photoelectric conversion unit, or by using a representative value of each of red, green, and blue pixels of the photoelectric conversion unit.

7. The photographing apparatus of claim 1, wherein an optical axis of the lens array is moved in a direction in which light is irradiated that is perpendicular to the photoelectric conversion unit at a periphery portion of the photoelectric conversion unit.

8. A photographing method of a photographing apparatus, the photographing apparatus comprising a lens array in which a plurality of lenses are regularly arranged on a single plane and a photoelectric conversion unit comprising a plurality of photoelectric conversion areas each including a plurality of pixels, the plurality of photoelectric conversion areas installed on a single plane, each of the plurality of photoelectric conversion areas corresponding to an irradiation range of light passing through one of the plurality of lenses of the lens array, the photographing method comprising:

selecting a data read-out mode from among a first mode and at least one second mode; and reading out data according to the selected data read-out mode;

wherein in the first mode, data is continuously read out from all pixels included in the plurality of photoelectric conversion areas; and wherein in the at least one second mode, a subset of fewer than all pixels of each of the plurality of photoelectric conversion areas are selected and used to generate a color image, wherein the selected pixels of each of the plurality of photoelectric conversion areas are at relatively the same positions with respect to each respective lens of the lens array, and wherein data is continuously read out from the selected pixels.

* * * * *